United States Patent [19]
Kuhn et al.

[11] Patent Number: 5,643,131
[45] Date of Patent: Jul. 1, 1997

[54] CONTINUOUSLY VARIABLE TRANSMISSION WITH WIDE TRANSMISSION RATIO RANGE

[75] Inventors: Walter Kuhn, Friedrichshafen; Hartmut Herter, Meckenbeuren, both of Germany

[73] Assignee: ZF Friedrichshafen AG, Friedrichshafen, Germany

[21] Appl. No.: 513,978

[22] PCT Filed: Mar. 16, 1994

[86] PCT No.: PCT/EP94/00832

§ 371 Date: Sep. 14, 1995

§ 102(e) Date: Sep. 14, 1995

[87] PCT Pub. No.: WO94/21941

PCT Pub. Date: Sep. 29, 1994

[30] Foreign Application Priority Data

Mar. 19, 1993 [DE] Germany .................. 43 08 761.2

[51] Int. Cl.⁶ ............................................. F16H 37/02
[52] U.S. Cl. ................................... 475/210; 74/665 P
[58] Field of Search .............................. 475/217, 210, 475/213, 214; 74/665 P; 474/8

[56] References Cited

U.S. PATENT DOCUMENTS

| 4,885,955 | 12/1989 | Kraus . |
| 5,121,936 | 6/1992 | Cowan .................. 475/210 |

FOREIGN PATENT DOCUMENTS

| 0210053 | 1/1987 | European Pat. Off. . |
| 0347186 | 12/1989 | European Pat. Off. . |
| 3323466 | 1/1985 | Germany . |

*Primary Examiner*—Charles A. Marmor
*Assistant Examiner*—Sherry Lynn Estremsky
*Attorney, Agent, or Firm*—Davis and Bujold

[57] ABSTRACT

The invention concerns a continuously variable transmission having a driving and a driven shaft (1, 9) and first and second intermediate shafts (10, 11). Power is transmitted to the driven shaft (9) through a transmission variometer with i² arrangement. According to the invention, the input power of the transmission is transmitted to the driven shaft through a transmission branch with constant ratio and through the continuously variable transmission branch. This power distribution reduces the proportion of the power transmitted through the continuously variable transmission branch. The transmission efficiency of the whole transmission may, in particular, be thus improved. This continuously variable transmission is designed for use in private cars and light utility vehicles.

9 Claims, 1 Drawing Sheet

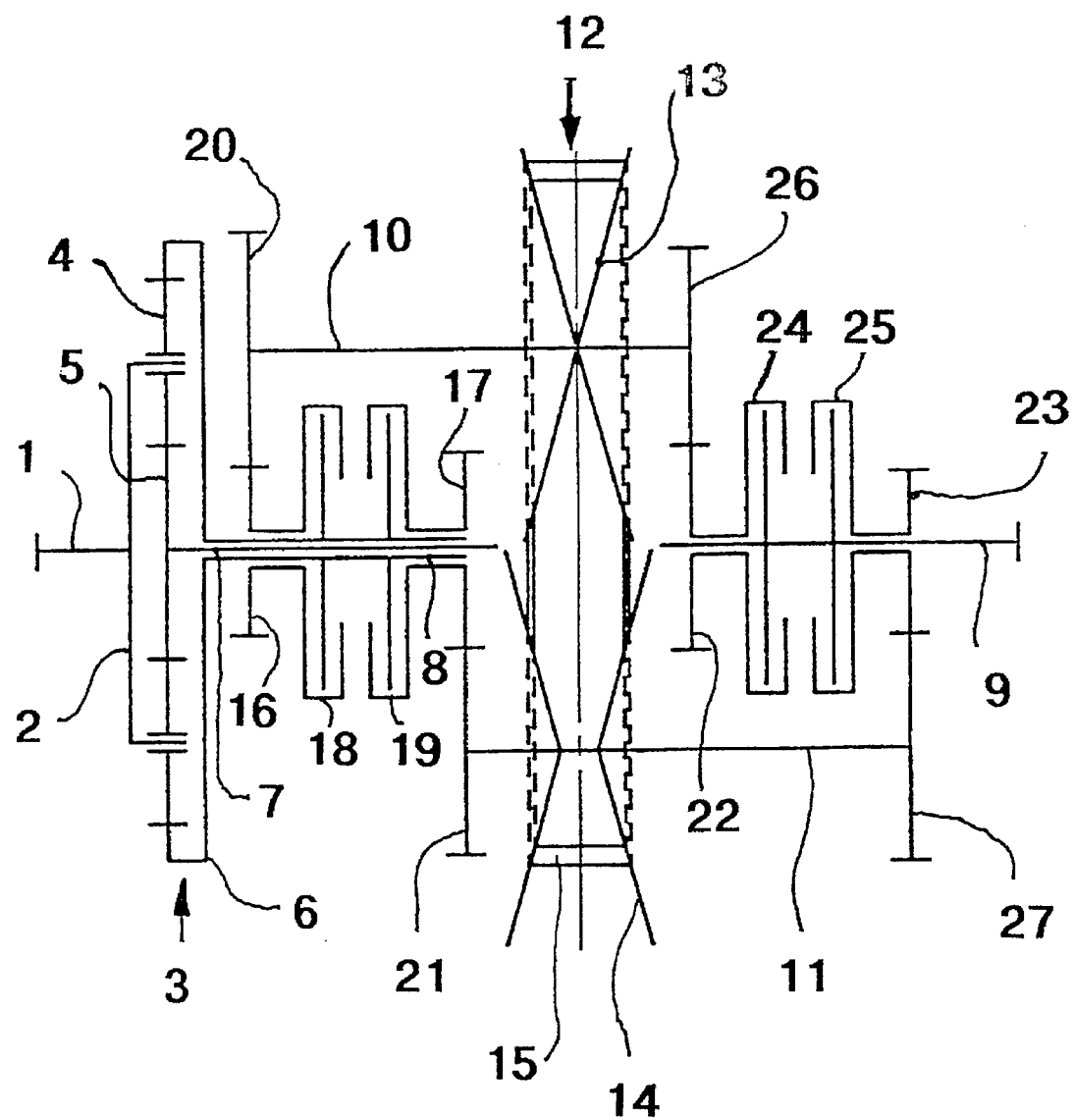

CONTINUOUSLY VARIABLE TRANSMISSION WITH WIDE TRANSMISSION RATIO RANGE

The invention concerns a continuously variable transmission having a driving and a driven shaft, first and second intermediate shafts, first and second driving means for connecting the driving shaft with the first or second intermediate shaft. Third and fourth driving means are complementarily provided which connect the first or second intermediate shaft with the driven shaft. The power of the transmission flows through a variometer which interconnects the first and second intermediate shafts.

BACKGROUND OF THE INVENTION

A continuously variable transmission, of the above explained construction, has also been disclosed under the designation CVT with $i^2$ arrangement (Multi-pass Continuously Variable Transmission). With it the ratio range (that is, the range of adjustment as a proportion of the maximum to minimum ratio) of a mechanical variometer can be raised to the second power.

In EP-A-O 210 053 a CVT with $i^2$ arrangement has been disclosed. The peculiarity of said arrangement is to be seen in that the variometer is asymmetrically designed so that the maximum step-down ratio can be equal to or smaller than the maximum reduction ratio.

In comparison with a stepped selector transmission, continuous transmissions in general suffer the disadvantage of a poorer transmission efficiency.

SUMMARY OF THE INVENTION

The problem on which this invention is based is to provide a continuous transmission of the above mentioned kind which stands out by a wide ratio range of the whole transmission together with a good efficiency of the whole transmission and a high load capacity.

The problem on which the invention is based is solved by the fact that the input power of the transmission is transmitted to the driven shaft through a transmission branch with constant ratio and through the continuous transmission branch.

By means of the proposed power distribution, the input power of the transmission is distributed in several branches. The power flows via at least one transmission branch with constant ratio and via a continuous transmission branch with a variable ratio. It is of particular advantage that the variometer works according to the $i^2$ concept. Due to the power distribution, the proportion of power transmitted via the continuous transmission branch is reduced. Thereby it is possible to improve the transmission efficiency of the whole transmission. This is based on the fact that the efficiency of the variometer enters only proportionately in the efficiency of the whole transmission. It is to be borne in mind here that the power distribution leads to a clear reduction of the power proportion of the variator and thus to the improvement of the efficiency of the whole transmission that is sought only when a wide ratio range is available, that is, the continuous transmission branch is designed with an $i^2$ arrangement. The wide adjustment range makes an additional torque converter unnecessary; this is an additional advantage that makes itself felt especially in a favorable fuel consumption with good mileage, especially good acceleration values. Besides, the noise level is considerably improved. Because of the low starting torque of the variometer, it is possible to use a variometer of relatively small design from which results, at low cost, a smaller installation space together with favorable efficiency. The transmission proposed according to the invention can be preferably used in private cars and light commercial vehicles.

A continuously variable transmission, where a power distribution can be obtained by simple means, is advantageously characterized by the fact that the driving shaft drives a transfer differential which has two output shafts of which one is connected with the driven shaft. In this manner, at least one transmission branch is provided with a constant ratio. It is obviously possible to provide several output shafts so that the practical embodiment of several constant transmission branches is possible.

This is of special advantage when the transfer differential is formed by a planetary transmission. By a simple planetary transmission it is possible to obtain a power distribution characterized by a small installation space at a low cost of production. In this case, the web of the planetary transmission is connected with the driving shaft, while the large main gear is in driving connection with a hollow shaft (one of the output shafts) and the small main gear with the driven shaft. The power proportion of the continuous transmission is clearly reduced hereby. A higher efficiency of the whole transmission appears therewith. The fuel consumption is favorably affected by the improved efficiency. The noise level is good.

It is advantageous to arrange concentrically to each other the output shafts of the transfer differential. The inner output shaft is designed as solid shaft while the outer output shaft is designed as hollow shaft. Gears, which mesh with gears of a respective intermediate shaft, are placed upon said hollow shaft. A driving connection of the hollow shaft to one of the intermediate shafts can be shifted by shifting elements in order to drive either one or the other side of the variometer.

When the gears, supported on the hollow shaft, are designed as idler gears and the gears of the intermediate shafts are designed as fixed gears, the required shifting elements can be arranged at the center. This measure also reduces the required installation space. It is here of further advantage and also possible structurally to combine the shifting elements to form a double clutch. The shifting elements needed to actuate the double clutch can be easily housed within the transmission due to their central position. The same also applies to the oil supply when the double clutch is designed as a wet multi-disc clutch.

To save expense, it must be sought to use the same parts for multiple purposes. In particular, this is possible when the configuration of the transmission on the output side allows the use of equal structural parts. To obtain a compact construction also on the output side of the transmission, gears which mesh with gears of a respective intermediate shaft are supported on the driven shaft. Through shifting elements which can be designed structurally equal to the drive side, a driving connection of one of the intermediate shafts via the variometer to the respective other intermediate shaft is optionally shifted.

The objective of a construction that is compact, easy to understand and of easy access is accomplished by the step that the gears supported on the driven shaft are designed as idler gears and those which are on the intermediate shafts as fixed gears.

With each idler gear of the driven shaft is, in turn, advantageously coordinated a shifting element. The shifting elements also can here be structurally combined to form a double clutch.

Depending on the structural conditions, the transfer differential proposed as power distribution can be situated either on the input side of the transmission or on the output side of the transmission. From the available possibilities and taking into account the installation conditions, the expert will select the one that is favorable at the moment. The variometer should have a ratio range of at least the factor 4. It is likewise possible to use a belt drive transmission or a friction gear transmission.

BRIEF DESCRIPTION OF THE DRAWING(S)

Other features essential to the invention and the advantages resulting therefrom are to be deduced from the description that follows of an embodiment.

The only figure shows, in a greatly simplified diagrammatic illustration, an embodiment for a power distributed continuous transmission with an $i^2$ arrangement.

DESCRIPTION OF THE PREFERRED EMBODIMENTS(S)

A driving shaft 1 drives a web 2 of a simple planetary transmission 3 which performs the function of a transfer differential. Instead of a transfer differential, a collector differential which then has the function of an output differential could also be used. Several planets 4, which are in meshing driving connection with a small main gear 5 and a large main gear 6, are rotatably supported on the web 2.

The small main gear is non-rotatably situated upon a first output shaft 7 of the planetary transmission 3. The large main gear drives another output shaft 8 which is designed as hollow shaft and placed concentrically with the first output shaft 7.

For the sake of clarity, in the drawing it has been omitted that the output shaft 7 is directly connected with a driven shaft 9 of the transmission. The transmission branch (first output shaft 7 and driven shaft 9) driven by the small main gear 5 works at a constant ratio.

A first intermediate shaft 10 and a second intermediate shaft 11 extend parallel to the first output shaft 7, the driven shaft 9 and the output shaft 8. The intermediate shafts 10 and 11 are interconnected via a continuously adjustable variometer 12. As known per se, for this purpose bevel discs 13 and 14, arranged in pairs, are situated on the intermediate shafts 10 and 11. A traction element such as a sliding jointed belt 15 extends between the bevel discs.

Two gears 16 and 17, designed as idler gears, are situated upon the output shaft 8 of the planetary transmission 3 designed as a hollow shaft. A shifting element 18 and 19, by which in the engaged state the gear 16 or the gear 17 can be non-rotatably connected with the output shaft 8, is coordinated with each one of the gears 16 and 17. The gear 16 is in constant meshing connection with a gear 20 upon the intermediate shaft. The gear 20 is designed as a fixed gear. Similarly to this the gear 17 is constantly meshed with a gear 21 of the intermediate shaft 11. The gear 21 is likewise formed as a fixed gear.

Additional gears 22 and 23, also designed as idler gears, are rotatably supported on the driven shaft 9. Added shifting elements 24 and 25, with which either the gear 22 or the gear 23 can be non-rotatably connected with the driven shaft 9, are provided.

The gear 22 meshes with a gear 26 of the intermediate shaft 10. The gear 23, for its part, is in meshing driving connection with a gear 27 which is non-rotatably connected with the intermediate shaft 11.

The function or the power flow in the operation of the above explained continuously variable transmission is as follows:

The input power of the transmission flows through the driving shaft 1 and the web 2 in the planetary transmission 3. The input power of the transmission is distributed there. The power proportion of the constant transmission branch flows through the small main gear 5 directly to the output shaft 7 and the driven shaft 9 connected therewith. The transmission has two ratio ranges in the forward travel direction. In the first ratio range, the shifting elements 18 and 25 are engaged. The power proportion in the continuous transmission branch flows through the large main gear 6 to the output shaft 8 and from there, through the pair of gears 16–20, to the intermediate shaft 10. Then said power proportion flows through the variometer 12 to the intermediate shaft 11 and from there, through the pair of gears 27–23, back to the driven shaft 9. The shifting elements 19 and 24 are disengaged so that no power is transmitted via the pair of gears 26–22 and 17–21.

In the second ratio range in the forward direction of travel, the shifting elements 19 and 24 are engaged while the shifting elements 18 and 25 are disengaged. The power proportion in the continuous transmission branch flows through the pair of gears 17–21 to the intermediate shaft 11, from there to the intermediate shaft 10 through the variometer 12 and finally back to the driven shaft 9 through the pair of gears 26–22. In this case, no power is transmitted via the pair of gears 16–20 and 27–23.

When the transmission explained must have a ratio range of 8, the following conditions are the point of departure:

For a distinct reduction of the power proportion in the continuous transmission branch which is at a maximum of 50% of the input power of the transmission, a wide ratio range is required within said continuous transmission branch. This is because a clear improvement of the efficiency of the whole transmission must be accomplished. For this ratio range in the continuous transmission branch, a factor of >15 is required. Since ratio ranges of 5.5 to 6.0 are possible with mechanical variometers, the required ratio range of 15 can only be reached when the continuous transmission branch is designed with an $i^2$ arrangement. Thus, for the case given by way of example of a passenger car, transmission variometers having a ratio range of approximately 4 can be used. Let it be complementarily noted that the power proportion of the variometer at maximum ratio of the whole transmission (starting) can be reduced to about 90% and in the smallest ratio of the whole transmission (overdrive) to about 30% of the input power of the transmission. Due to the considerable reduction of the power proportion transmitted by the variometer, a clear improvement of the efficiency of the whole transmission is possible. The use of a mechanical variometer with an $i^2$ arrangement makes a wide ratio range possible in the continuous transmission branch. Thus an additional torque converter becomes unnecessary. The fuel consumption is favorably affected. The mileage is good, which becomes evident especially in a good acceleration level. The $i^2$ arrangement makes possible the use of a relatively small variometer. This means a small installation space, acceptable cost of production and good efficiency. Since the range shift occurs a synchronous speed, the transmission stands out by good shifting quality and low clutch shifting energy. Since a shifting element, provided in any case, is simultaneously used as a starting element, this circumstance also has a favorable effect on the cost of production, the installation space needed and the weight of the transmission.

A multiple power distribution can also be provided instead of a simple power distribution. The simple power distribution can be obtained at a relatively low cost of construction with a transfer differential (on input side of the transmission, input differential) or a collector differential (on output side of the transmission, output differential). The power distribution in the simple power distribution to the constant and continuous transmission branches depends exclusively on the ratio range of the whole transmission and on the ratio range of the continuous transmission branch. It is therefore independent of the type of construction of the planetary transmission, that is, independent of the kind of wheel chain and of the stable transmission ratio.

Finally, let it also be pointed out that for reasons of clarity the illustration of a reverse travel range has been omitted.

Reference numerals 1 driving shaft
2 web
3 planetary transmission
4 planets
5 small main gear
6 large main gear
7 output shaft
8 output shaft
9 driven shaft
10 intermediate shaft
11 intermediate shaft
12 variometer
13 bevel discs
14 bevel discs
15 slider link belt
16 gear
17 gear
18 shifting element
19 shifting element
20 gear
21 gear
22 gear
23 gear
24 shifting element
25 shifting element
26 gear
27 gear

What is claimed is:

1. A continuously variable transmission comprising
   a driving shaft (1) and a driven shaft (9);
   a first intermediate shaft (10) and a second intermediate shaft (11);
   a first gear (20) and a second gear (26) supported by said first intermediate shaft (10);
   a third gear (21) and a fourth gear (27) supported by said second intermediate shaft (11);
   two first shifting elements (18, 19) to establish a driving connection of said driving shaft to one of said first and third gears (20 or 21);
   two second shifting elements (24, 25) to establish a driving connection of one of said second and fourth gears (26 or 27) to said driven shaft;
   a variometer (12) which interconnects said first and second intermediate shafts in a manner such that the input power of the transmission is transmitted to said driven shaft (9) through both a planetary transmission branch (5, 7, 9) having a constant ratio and through said variometer which provides a transmission branch having a continuously variable ratio;
   said planetary transmission having a web (2) in driving connection with said driving shaft (1), a small main gear (5) in driving connection with said driving shaft (1), and a large main gear (6) non-rotatably connected with a hollow shaft (8), in order to establish
   (i) in a first ratio range, via one of said first shifting elements (18), the driving connection with said first gear (20) and,
   (ii) in a second ratio range, via the other of said first shifting elements (19), the driving connection with said third (21);
   and, in the first ratio range, via one of said second shifting elements (25), establishing the driving connection of said fourth gear (27) to said driven shaft; and
   in the second ratio range, via the other of said second shifting elements (24), establishing the driving connection of said second gear (26) to said driven shaft,
   wherein said hollow shaft (8) supports two gears (16, 17), which respectively mesh with said first and third gears (20, 21); and
   said driven shaft (9) supports two additional gears (22, 23), which respectively mesh with said second and fourth gears (26, 27).

2. A transmission according to claim 1, wherein said two gears (16, 17) supported on said hollow shaft (8) are idler gears and said first and third gears (20, 21) of said intermediate shafts are non-rotatably connected therewith.

3. A transmission according to claim 2 wherein one of said first shifting elements (18, 19) is in driving connection with each of said idler gears (16, 17) of said hollow shaft (8).

4. A transmission according to claim 1, wherein said two additional gears (22, 23) supported upon said driven shaft (9) are idler gears and said second and fourth gears (26, 27) of said intermediate shafts (10, 11) are non-rotatably connected therewith.

5. A transmission according to claim 4, wherein one of said second shifting elements (24, 25) is in driving connection with each of said idler gears (22, 23) of said driven shaft.

6. A transmission according to claim 1, wherein said first shifting elements (18, 19) are combined to form a double clutch.

7. A transmission according to claim 1, wherein said variometer (12) has a ratio range of at least 4:1.

8. A transmission according to claim 1, wherein said second shifting elements (24, 25) are combined to form a double clutch.

9. A continuously variable transmission comprising
   a driving and a driven shaft (1, 9);
   a first and second intermediate shaft (10, 11);
   a first and second first gear (20, 21) respectively supported by said first and second intermediate shafts (10, 11);
   a first and second second gear (26, 27) respectively supported by said first and second intermediate shafts (10, 11);
   two first shifting elements (18, 19) to establish a driving connection of said driving shaft to one of said first and second first gears (20 or 21);
   two second shifting elements (24, 25) to establish a driving connection of one of said first and second second gears (26 or 27) to said driven shaft;

a variometer (12) which interconnects said first and second intermediate shafts in a manner such that the input power of the transmission is transmitted to said driven shaft (9) through both a planetary transmission branch (5, 7, 9) having a constant ratio and through said variometer which provides a transmission branch having a continuously variable ratio;

said planetary transmission establishing (i) in a first ratio range, via one of said first shifting elements (18), the driving connection upon said first intermediate shaft (10) with said first first gear and, (ii) in a second ratio range, via the other of said first shifting elements (19), the driving connection upon said second intermediate shaft (11) with said second first gear (21);

and, in the first ratio range, via one of said second shifting elements (25), establishes the driving connection of said second second gear (27) to said driven shaft; and in the second ratio range, via the other of said second shifting elements (24), establishes the driving connection of said first second gear (26) to said driven shaft.

* * * * *